United States Patent [19]

Keller

[11] Patent Number: 5,030,181
[45] Date of Patent: Jul. 9, 1991

[54] ARRANGEMENT OF AN ELECTROMAGNET COUPLING GEAR

[75] Inventor: Walter Keller, Salem, Fed. Rep. of Germany

[73] Assignee: Zahnradfabrik Friedrichshafen AG, Fed. Rep. of Germany

[21] Appl. No.: 411,481
[22] PCT Filed: Mar. 11, 1988
[86] PCT No.: PCT/EP88/00189
 § 371 Date: Sep. 20, 1989
 § 102(e) Date: Sep. 20, 1989
[87] PCT Pub. No.: WO88/07639
 PCT Pub. Date: Oct. 6, 1988

[30] Foreign Application Priority Data

Mar. 21, 1987 [DE] Fed. Rep. of Germany ....... 3709407

[51] Int. Cl.$^5$ ............................................. F16H 1/44
[52] U.S. Cl. ................................... 475/150; 192/84 A
[58] Field of Search ..................... 475/150, 231, 241; 192/84 A, 84 R, 84 AA, 84 PM

[56] References Cited

U.S. PATENT DOCUMENTS

| | | | |
|---|---|---|---|
| 3,414,100 | 12/1968 | Spencer | 192/90 |
| 4,546,865 | 10/1985 | Hodgman | 192/84 A |
| 4,662,499 | 5/1987 | Jordan | 475/150 |
| 4,733,577 | 3/1988 | Grieser et al. | 475/150 |
| 4,776,234 | 10/1988 | Shea | 475/150 |
| 4,781,078 | 11/1988 | Blessing et al. | 475/150 |

FOREIGN PATENT DOCUMENTS

| | | |
|---|---|---|
| 3608118 | 3/1986 | Fed. Rep. of Germany. |
| 8633084 | 6/1987 | Fed. Rep. of Germany. |
| 86/02981 | 5/1986 | PCT Int'l Appl. . |

Primary Examiner—Allan D. Herrmann
Assistant Examiner—Ryan W. Massey
Attorney, Agent, or Firm—Davis, Bujold & Streck

[57] ABSTRACT

The electromagnetic clutch that serves for positive-locking assembly of concentric transmission shafts is inserted in a transmission housing (2) concentrically in relation to a shaft (1) and with a bushing (10) which externally encloses it, there resulting outside the bushing (10), in the area of the annular magnet (16), a free space that reduces the leakage, and the sliding sleeve (18) and the armature plate (19) together with the magnet (16) and eventual additionally provided bearings (25) can be preassembled, ready for operation and protected against damage. On the outer end of the bushing (10) can be provided at the same time a roller bearing (25) for the clutch part (24) that carries the counter gear (22) on the other shaft. Due to the design that reduces the leakage and the arrangement in the area of a seal gap also existing in the transmission housing (2), it is possible to work with clutches of small dimensions and a transmission housing (2) of equal size can be used optionally with and without inserted clutches.

17 Claims, 2 Drawing Sheets

ARRANGEMENT OF AN ELECTROMAGNET COUPLING GEAR

The invention concerns an arrangement according to the preamble of claim 1 and departs from U.S. Pat. No. 3,414,100. Said publication disclosed the combination of separate parts of an electromagnet coupling gear to form a bushing with retaining flange in a manner such that their final assembly is simplified by inserting in a transmission housing the bushing together with coupling elements preassembled therein. But this known coupling system still has disadvantages which hinder or make impossible their use, specifically for locks on axle transmissions. Thus, in the principle already known the armature must be already assembled in the housing before there can be inserted the bushing in which only the magnet and a bearing have been preassembled. The armature and another intermediate element with axial gearing on the shaft must have been already assembled on the installation side before attachment of a coupling wheel. Therefore, the engaging gear does not project from the housing on the input side and the armature is comprised by the magnet only on face end and not also peripherally and thus a sufficient magnetic power can be transmitted only over an axial air gap to be kept relatively small. Due to the consequently limited stroke, only low teeth and thus only low torques are possible. The adjustment of the air play of the armature is here combined with the adjustment of the bearing. Besides, said coupling is disengaged under current and for this reason is already inadequate for locks which must be opened currentless.

Electromagnet gear couplings such as disclosed, for instance, in WO 86/022981 wherein ring magnet, sliding sleeve and armature are to be each separately fitted in a transmission housing, result in expensive assembly and installation conditions that take space and enlarge the magnetic stray flow. Higher electric performances then need in turn larger structural elements and additional construction and material costs. Specially to enlarge and particularly to design a transmission housing for mounting an electromagnetic gear coupling of such kind is often impossible, as for example, in standardize tubular housings such as exist in axle transmissions.

The problem to be solved by the invention is essentially to provide in an insert bushing which can be preassembled as completely as possible, an electromagnet gear coupling, also adequate for optional use as lock actuation in one piece axle transmissions, which operates quickly and noiselessly, wherein the engaging gear can be designed with sufficiently high teeth and the coupling wheel is on the input side before the housing and the armature is on the output side in the housing in which the electromagnet gear coupling can be inserted without impairing the air play of the armature and without there being required in the transmission changes worth mentioning in housing or installation.

The solution is obtained with the characteristic features of claim 1 mainly insofar as the ring magnet surrounds a sliding sleeve axially movable on the shaft and which for its part has the armature in the common assembly on the output side but a radial engaging gear projects from the housing on the input side. The assembly designed as bushing, completely ready for installation, is separately insertable in the housing and can be fastened by means of a flange without it being possible for the air play of the armature to change in the process.

A radial support of the bushing with axial spacing from the magnet allows a concentrating arrangement favorable to the magnetic flow, and if adequate material is selected for the parts surrounding the magnet, it is possible with only a single and relatively small ring magnet to obtain within the bushing sufficient shifting and retaining forces.

If the sliding sleeve is slid directly on top of an outer spline of the shaft and there is added the opposing gear situated on the frontal surface located on the engagement side of a further hub collar that acts as the external plate support of a frictional engagement device, the sliding sleeve can be held so as not to be able to turn upon the same outer spline of the shaft in the same manner as is the inner plate support of the frictional engagement device.

If the sliding sleeve is introduced so as not to be able to turn into an inner spline of a hub collar and there are added the opposed gear teeth disposed on the meshing side of the frontal surface of a further hub collar that acts as an inner plate support for a frictional engagement device, the sliding bushing can be isolated from possible sliding movements of the shaft which may, for example, occur in driven axles of motor vehicles. The frontal teeth, being then disposed on the smaller hub collar, are also easier to manufacture.

An annular collar extending radially beyond the sliding sleeve and disposed axially between the magnet and the bearing not only can serve as a stop and thus preclude the need for a bushing end plate outside of the armature plate, but, given a magnet of suitable design can also be used as a counter armature during the resetting action or can accept on its front facing the mesh, either reset springs or stopping bolts.

By means of screw bolts located in the hub collar, the heads of which bolts extend in the annular collar on the magnet side but are not movable therethrough a finely adjustable end stop for the sliding sleeve can be produced in the direction of the opening without an end plate of the bushing.

Should an end plate for the bushing serving as a stop for the sliding sleeve in the direction of the opening be used, the space occupied by the above-mentioned screw bolts for example, will be free to accept the reset springs.

If a plate is secured in the bushing so that it can be removed, such a plate can quite easily be produced from non-magnetic material for the purpose of increasing the magnetic flux.

If, when the sliding sleeve occupies the open position, a certain air gap is created axially between the annular magnet and the annular collar, not only is the magnetic flux improved, but the annular magnet, in the event the roller bearings become more severely compressed, is prevented from becoming a striking surface.

Reset springs arranged between the annular collar of the sliding sleeve and the opposite hub collar ensure that, when no current is flowing through the magnet, the drive gears will not accidentally engage.

A turned groove of suitable radial dimensions located in the frontal area enables the particularly rigid support of the annular collar of the bushing inside the inner flange of the transmission housing, and does not necessitate a lengthening of the overall transmission housing.

The arrangement of the drive gears radially outside the reset springs, e.g. on the annular collar of the sliding sleeve, facilitates the concentric installation of a single spring over the shaft, and the use of a particularly short sliding sleeve is made possible.

Should the armature plate be designed so that its diameter diminishes in the direction on the annular magnet, and there be radially separated by an airgap from such armature plate, a magnetic ring situated inside the bushing and axially mounted between the plate and annular magnet, whose inside diameter diminishes at approximately the same angle toward the annular magnet, the magnet flux will be improved and a more reliable engagement will be achieved in closing direction.

Oil channels, which surround the bushing inside the flange and are disposed more or less parallel to the shaft in principal direction permit the unimpeded axial flow of lubricant axially through the clutch zone which is specially important in axle transmission systems.

The virtually radial disposition of the annular magnet inside the bushing underneath the external flange permits a cable to be introduced into the protective zone of the flange so as to avoid a weakening of the transmission housing at exposed points.

The combination of the proposed electromagnetic clutch arrangement with a known shaft-driving differential gear can work to advantage in a number of ways:

The clutch can, in any event, be inexpensively and reliably installed in a number of ways inside the axle casing.

Should the differential in question not be of the self-locking kind, a simple differential can be caused to become fully lockable. Should, on the other hand, the differential be of the self-locking kind, the clutch would not be set in motion with every little change in speed and, thus because its gears would not be overworked, would be able to provide longer-lasting service. Because full locking can be initiated by the clutches with the help of special sensors, it is also possible to decrease the locking coefficient of the differential and thus reduce tire wear and the motive power required while at the same time maintaining, due to the instantaneous engagement of all the wheels through the electromagnetic clutch, complete braking reliability.

The arrangement according to the invention permits the structural means for the insertion of an electromagnetic clutch unit be limited to an internal bearing area or a turned groove inside the inner flange of the housing in question and thus precludes the need for different axle casings with or without lockable clutch.

It is nonetheless also possible, e.g. in the case of axles, to provide both tubular housing halves for the axles shafts for the purpose of accepting such bushings, and either let both work together with the differential, or insert in one of the halves, an electro brake of essentially the same construction as that of the electromagnetic clutch.

The invention is not limited to the combination of features of the claims. Other important possible combinations of claims and particular features of the claims result for the expert according to the stated problem.

The invention is described in detail herebelow with reference to three embodiments according to the diagrammatic drawings.

FIG. 1A is a detailed drawing of part of FIG. 1 showing a conically shaped armature plate for the purpose of facilitating start up.

Figure 1:
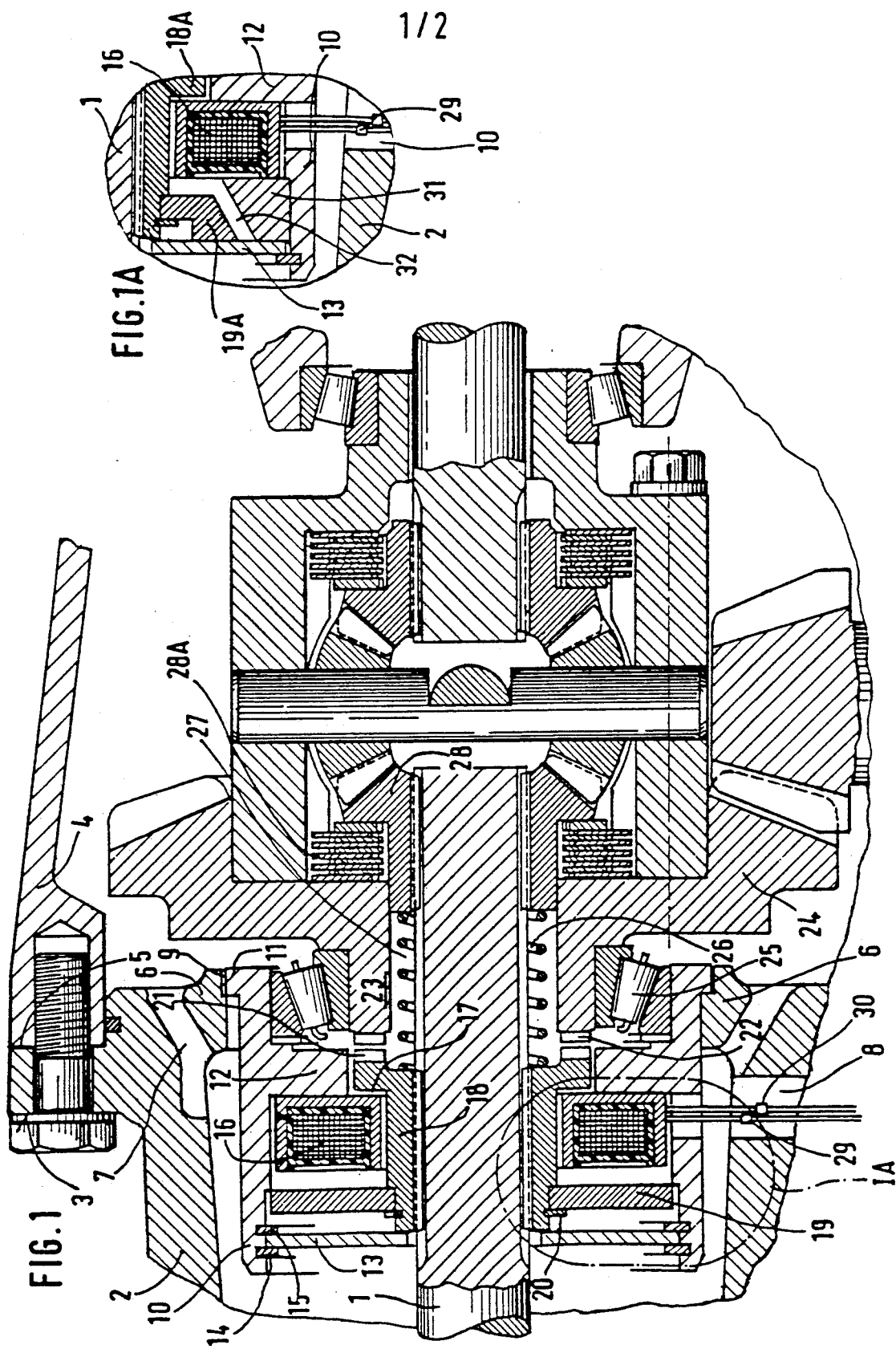
FIG. 1 is a section through an electromagnetic clutch arrangement in a preassembled bushing, wherein the unengaged sliding sleeve is positively locked directly to the shaft it drives.

In FIG. 1, a shaft 1 is surrounded by the tubular end of a transmission housing 2, on which an outer flange 3 on the tube side features a sealed joint gap 5 for the purpose of connection with counter flange 4 of another housing half. Situated radially underneath flange 3 is an inner flange 6 in which oil channels 7 can be disposed more or less parallel to shaft 1 about the circumference. At least one cable duct 8 is arranged in flange 3 preferably radially in relation to the shaft in order to connect with the magnet. A bushing 10, which can be inserted into the opening of inner flange 6 in telescopic fashion and concentrically to the shaft, can be axially fixed in a number of ways. In the example shown, bushing 10 possesses an outer annular collar 11 that fits into a radially turned groove 9 so that the bushing 10 axially requires no additional space for installation. Along approximately one third of the length of bushing 10 is an inner annular shoulder 12 produced from the same ferromagnetic material as bushing 10. The inner end of bushing 10 facing away from the mesh is formed by an annular plate 13, in this case axially secured in the bushing by means of locking rings 14 and 15. An annular magnet 16 sits against inner annular shoulder 12 axially between plate 13 and the inner annular shoulder 12. In this connection, an axial air gap or clearance 17 remains opposite a sliding sleeve 18 unturnable in a spline of the shaft but axially slidable and turnable in relation to the annular magnet 16, the end of which sliding sleeve facing away from the mesh lies against plate 13 when the clutch is in unengaged condition. Sliding sleeve 18 carries at this end an annular armature plate 19 consisting of ferromagnetic material and also separated from the magnet 16 when the clutch is unengaged, such armature plate in the example given being axially fixed on the sliding sleeve 18 by means of a locking ring 20 and a radial turned groove situated on the side facing the magnet. On the end of the sliding sleeve 18 facing the mesh is a set of radial drive teeth 21, which, when current flows through the magnet 16 meshes with a similar counter set of teeth 22 located on the magnet-facing frontal side of hub 23 of any kind of clutch wheel 24. According to the example, a roller bearing 25 is passed a short distance in front of counter gear teeth 22 through hub 23 and concentrically to shaft 1. In this example, the outer ring of the roller bearing is borne in the bushing 10 situated inside inner flange 6. In the example given, between shaft 1 and hub 23 is located an annular space 27 in which, when the clutch is engaged, a reset spring 26 coiled around shaft is axially preloaded between the mesh-facing frontal side of the sliding sleeve 18 and a driven collar or toothed gear 28. The electrical supply for the magnet 16 is provided through cables 29, 30 located in cable duct 8.

FIG. 1A illustrates an alternative possibility of control of the starting power of electromagnet 16 wherein the armature 19A is axially fixed inside bushing 10 with an external diameter that diminishes in the direction of magnet 16 and a magnetized ring 31 radially situated thereabove that correspondingly increases in diameter toward magnet 16. Thus, an equal adjustment length will create a smaller air gap 32 for the armature 19A that facilitate starting and save electricity.

The construction illustrated enables the elements of the electromagnetic clutch, preassembled with a view to fulfilling any one of a number of functions, to slide as a unified assembly that is protected against damage, through the open side of the housing flange assembly 3, 4 onto shaft 1, without occasioning the need for either shaft 1 or transmission housing 2 to be modified.

Figure 2:
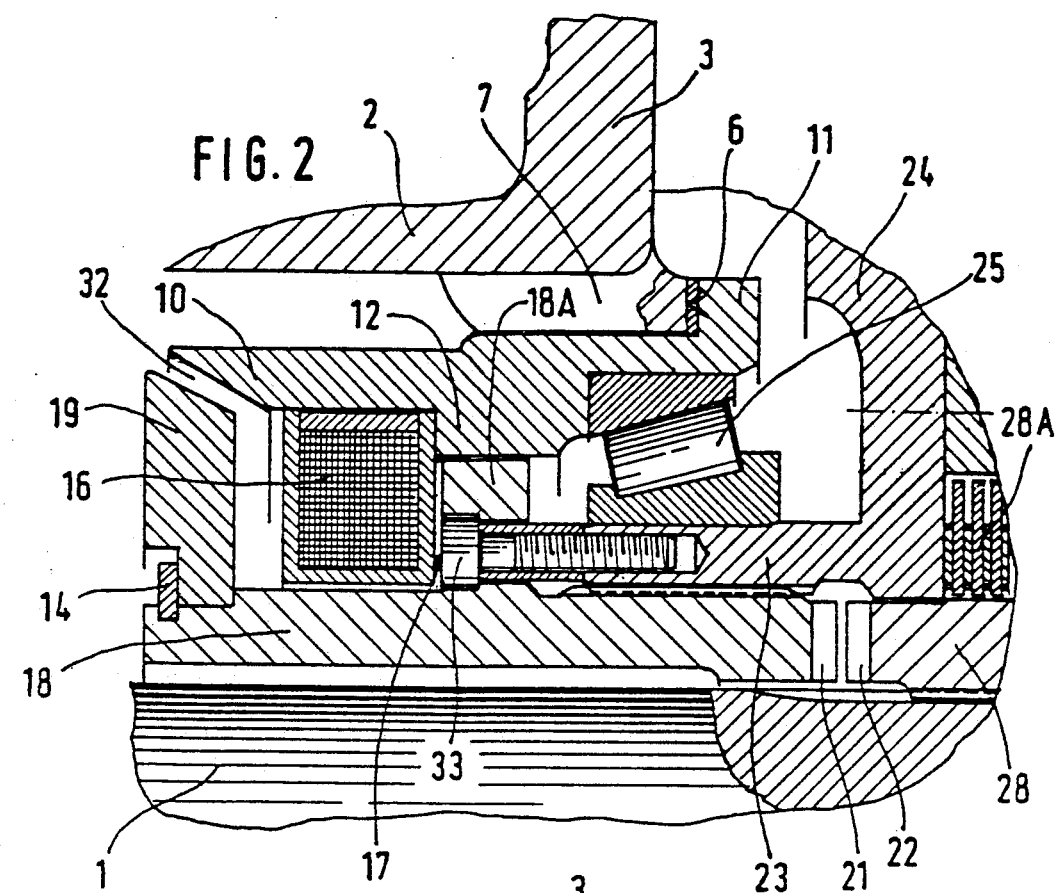
FIG. 2 shows an alternative arrangement wherein the sliding sleeve is rotated about the hub of the coupling of the driven shaft before its frontal part independently of the driven shaft before its frontal gear teeth are coupled with the hub of the shaft to be driven. Here is provided an axially adjustable stop in the open position by means of screw bolts.

In FIG. 2, sliding sleeve 18 inserted with an outer spline on the mesh side into an inner spline of the driving hub 23, is not locked to shaft 1. In this case, however, hub 23 forms part of a propelling outer plate support of a frictional assembly 28A, due to wheel actuation by an inner plate support (28) locked to shaft 1 by means of a spline, the speeds of the driving clutch part and of the shaft to be driven are matched with one another as much as possible before clutch 21, 22 engages. In this connection, hub 23 extends clearly axially beyond gear teeth 21, 22. Between gear teeth 21, 22 and magnet 16, predominantly still axially inside bushing 10, is arranged a spline for the sliding sleeve 18 and the hub 23. But sliding sleeve 18 could also be torsionally driven directly with the aid of screw bolts 33 that are axially inserted into hub 23, whereby such screw bolts 33 fit axially between magnet 16 and hub 23 through bores in an exteriorly extending annular collar 18A of sliding sleeve 18. The screw bolts 33 if provided with suitable length and heads of suitable size, can be designed to restrict the stroke length of sliding sleeve 18. Such an arrangement ensures that, even when the clutch is open, the annular collar 18A will still be separated from the annular magnet 16 by a residual air gap or clearance 17. When magnet 16 is excited, armature plate 19 that acts as an end plate for bushing 10, is drawn, upon sliding sleeve 18 which carries it towards magnet 16 until it grips clutch assembly 21, 22. In this embodiment, sliding sleeve 18, together with the clutch wheel 24, which may for example be the ring gear of a differential, are able to rotate relative to shaft 1, and run synchronously therewith, if the gears 21, 22, are engaged. In this connection, the friction resulting in the annular collar 11 of the bushing 10 can be reduced by means of a buffer disk provided in the inner flange 6 of the housing.

Such an embodiment also has, in relation to FIG. 1 the advantage that the electromagnetic stray currents reaching the shaft 1 are considerably reduced, since the sliding sleeve 18 does not exhibit, up to the point of gear engagement, a close magnetic affinity for shaft 1. To further strengthen the electromagnetic effect, the screw bolts 33 as well as the spacing sleeves (not numbered) inserted therewith can be produced from a non-magnetic material. The sliding sleeve 18 remains uninfluenced by this arrangement from the axial movements of the shaft 1, as they mostly appear in the steering axle.

Figure 3:
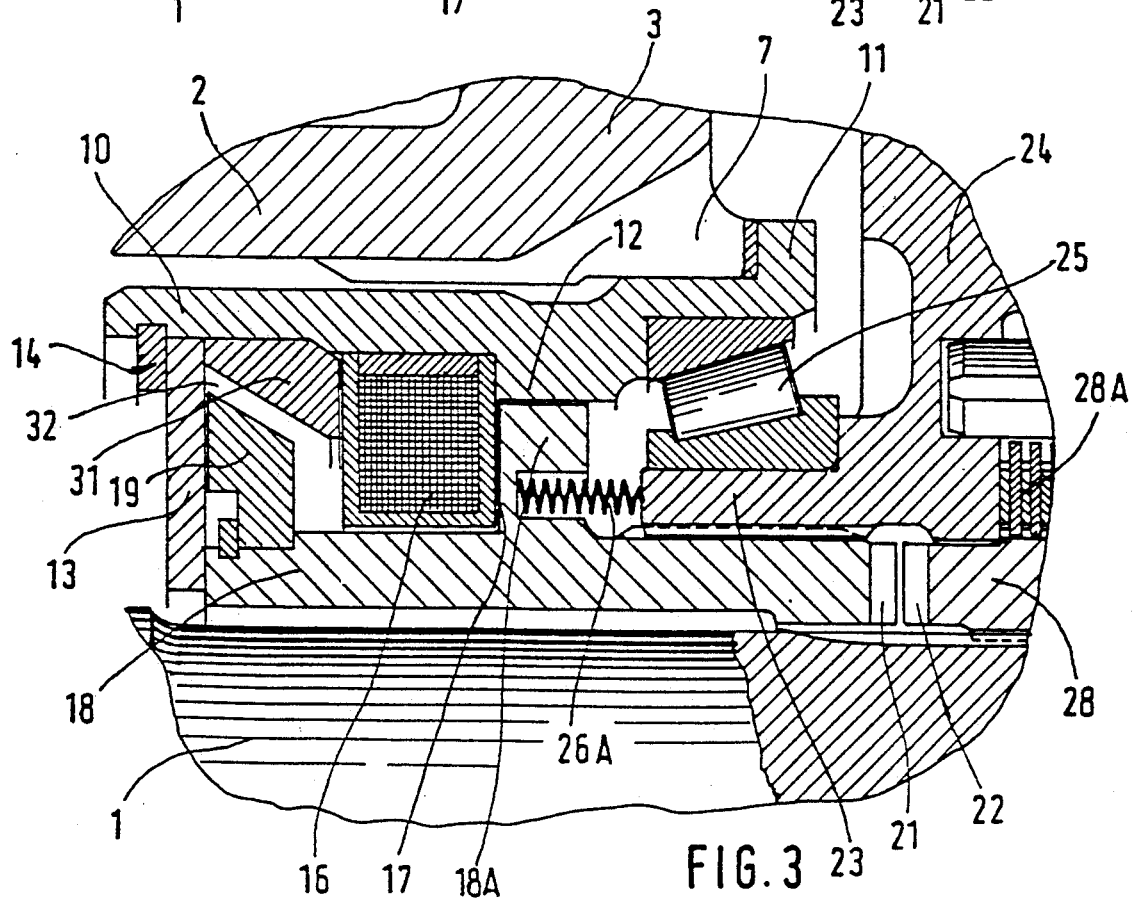
FIG. 3 shows an alternative arrangement of the drawing illustrated in FIG. 1 wherein the axial stop is disposed between the sliding sleeve and a plate of the bushing and closes the sliding sleeve against a reset spring.

In FIG. 3, the sliding sleeve 18 also form-fits in the manner indicated in FIG. 2 with clutch wheel 24 by means of the spline in hub 23. In this example, however, are shown methods of axially accomodating reset springs 26A inside bushing 10 between hub 23 and annular collar 18A, which, according to the arrangement shown in FIG. 1 would have to be separately slid directly on top of shaft 1. In addition, for the purpose of bolstering the magnetic force of magnet 16, a magnetized ring 31 is installed in the inner wall of bushing 10 on the side facing the armature plate, which magnetized ring 31 works together by means of parallel-conical surfaces with the armature plate 19 that forms the end of the sliding sleeve 18 facing away from the mesh. Should screw bolts 33 be provided as stops on the open side, yet not in replacement of individual reset springs 26A, similar to FIG. 2, the here shown plate 13 of bushing 10 is able to serve as a stop and prevent the passage of dirt from the axle transmission to the interior of the clutch.

Due to the fact that plate 13 is constructed of a non-ferrous metal, and bushing 10 is separated from transmission housing 2, and due to the arrangement that produces above magnet 16 an air gap about the freely extending and presupported bushing 10, loss of magnetism through stray flux is minimized to the greatest extent possible, which in turn reduces the electric power required for start-up. The openings in front of oil channels 7 and the free space located between bushing 10 and transmission housing 2 moreover permit cables 29, 30 to be installed without sustaining damage and without hampering the gear-lubrication system. The above-mentioned exemplified installation is not only applicable to electromagnetic clutches but also for example to specifically designed disk brakes. For example, it could be advantageous in the case of vehicular transmissions to provide the wheels with bifurcating axle casings for the optional installation of a housing of the proposed type, so that for example to one plug-in shaft could be attached an electromagnetic locking clutch of the type shown and to the oppositely situated plug-in shaft, a wet electro brake. The special advantage thus achieved is that when the brakes are applied, lubricating oil flows radially through the spaces separating the brake disks toward housing 2 into the annular gap surrounding bushing 10 and into oil channels 7 of inner flange 6 to further cool the air-cooled outer jacket of housing 2.

1—shaft
2—transmission housing
3—flange of 2
4—opposite flange of 3
5—seal gap of 3, 4
6—inner flange of 2
7—oil channel in 2
8—cable channel in 2
9—turned groove in 6
10—bushing
11—annular collar of 10
12—inner annular shoulder on 10
13—plate of 10, buffer disk
14—outer locking ring of 13
15—inner locking ring of 13
16—annular magnet
17—air gap around 16
18—sliding sleeve
18A—annular collar on 18
19—armature plate
20—locking ring of 20
21—drive gear on 18
22—counter gear
23—hub
24—clutch part
25—roller bearing
26—reset spring 27—annular space in 24
28—collar, gear
28A—frictional assembly of 24 and 1
29—cable to 16
30—cable of 16
31—magnetic ring 10
32—air gap between 19 and 31
33—screw bolts in 28

I claim:

1. An arrangement of an electromagnet gear coupling which has a bushing (10) inserted in a housing (2) with a flange (3),
said bushing having a ring magnet (16) preassembled therein for actuating an engaging gear (21) surrounding a shaft (1), and
a coupling wheel (24 and 28) with a counter gear (22) being situated adjacent said engaging gear (21), characterized in that
(a) said bushing (10) in addition to the ring magnet (16) is joined together with an axially movable sliding sleeve (18) supporting said engaging gear (21) adjacent one end thereof and carrying an armature disc (19) adjacent the opposite end of said sliding sleeve remote from the contact of the gears (21, 22) and thereby forms an operatively preassembled assembly,
(b) said assembly being inserted in said bushing (10) concentrically with said shaft (1) to be coupled in the area of a bearing (25) of said coupling wheel (24),
(c) and said engaging gear (21) being engageable, upon activation of said ring magnet (16), with said counter gear (22) mounted outside said bushing (10) on a hub (23) of said coupling wheel (24) which encloses said shaft (1).

2. An arrangement according to claim 1, characterized in that said bushing (10) supported in said housing (2) can be preloaded, via the external ring of said bearing (25) that guides the hub (23) into said housing (2), against the internal ring of said bearing lodged in said hub (23) in a manner such that adjustments of the housing flange connections (3, 4) leave unaffected the axial spacings between said armature (19), said engaging gear (21) and said ring magnet (16).

3. An arrangement according to claim 1, characterized in that said bushing (10) is connected, via a ring collar (11), with an inner flange (6) of said housing (2) and the ring collar (11), once installed, comes to lie substantially radially over said bearing (25).

4. An arrangement according to claim 3, characterized in that said inner flange (6) has a radial groove (9) for said ring collar (11) of said bushing (10) so that the latter is situated axially snugly relative to the front face on the contact side of said inner flange (6) of said housing (2).

5. An arrangement according to claim 3, characterized in that between said bushing (10) and the inner wall of said housing (2) there are provided oil ducts (7) extending substantially co-parallel with said shaft (1) and penetrating said inner flange (6) outside said bushing (10).

6. An arrangement according to claim 1, characterized in that said ring magnet (16) is inserted in said bushing and is situated substantially radially beneath the flange (3) of said housing (2) into which is worked a cable duct (8) for connecting cables (29, 30) of said ring magnet (16).

7. An arrangement according to claim 1, characterized in that said housing (2) is an axle housing and said hub (23) or said gear (28) that carries said counter gear (22) is supported on a differential transmission concentric with said shaft (1), and said hub (23) acts as crown gear and said gear (28) as axle bevel gear and carries the inner ring of said bearing (25).

8. An arrangement according to claim 1, characterized in that said sliding sleeve (18) is non-torsionally guided on said shaft (1) by an internal gearing engaging an external gearing of said shaft (1) and said hub (23) is part of a friction connection (28A) which interacts with another non-torsional collar (28) on said shaft (1), and means are provided to connect said electromagnet gear coupling (16) periodically after activation of said friction connection (28A).

9. An arrangement according to claim 8, characterized in that said sliding sleeve (18) has an external gearing which meshes in an internal gearing of said hub (23).

10. An arrangement according to claim 8, characterized in that said sliding sleeve (18) has, on an integrally formed ring collar (18A) radially projecting axially between the ring magnet (16) and the bearing (25), a stop in the disengaged direction of said gear coupling (21, 22) opposite an end face of said hub (23) or of an internal ring of said bearing (25) fastened thereon and projecting on the contact side.

11. An arrangement according to claim 10, characterized in that said stop consists of said ring collar (18A) interacting with expansion bolts (33) axially threaded in the end of said hub (23) on the contact side and inserted during preassembly.

12. An arrangement according to claim 10, characterized in that an axial air gap (17) remains between said ring magnet (16) and said ring collar (18A) of said sliding sleeve (18) in the disengaged position.

13. An arrangement according to claim 10, characterized in that at least one recoil spring (26) is supported axially between said ring collar (18A) of said sliding sleeve (18) and a gear-free end face of one of said hubs (23, 28).

14. An arrangement according to claim 13, characterized in that said gear (21) is situated radially outside said recoil spring (26) on the end face on the contact side of said ring collar (18A) of said sliding sleeve (18).

15. An arrangement according to claim 8, characterized in that a disc-like bottom (13) axially closes said bushing (10) and said sliding sleeve (18) axially abuts against the dics-like bottom when said gear coupling (21, 22) is disengaged.

16. An arrangement according to claim 15, characterized in that said disc-like bottom (13) is detachably fastened in said bushing (10) and consists of non-magnetic material.

17. An arrangement according to claim 15, characterized in that said armature disc (19) consists of a ring disc (19A) which tapers in diameter in the direction of said ring magnet (16) and which in a currentless state is located, while keeping a conical air gap (32), radially outside a pole ring (31) which tapers in diameter at substantially the same angle in the direction of said ring magnet (16) and which is axially clamped on the inner side of said bushing (10) between said ring magnet (16) and the dics-like bottom (13).

* * * * *